United States Patent [19]
Fagin et al.

[11] 3,842,922
[45] Oct. 22, 1974

[54] VEHICLE WEIGH SCALE

[75] Inventors: Earle Reid Fagin, Mississauga, Ontario; Charles Franklin Latter, Brampton, Ontario, both of Canada

[73] Assignee: Magnatech Ltd., Scarborough, Ontario, Canada

[22] Filed: Apr. 8, 1974

[21] Appl. No.: 458,515

[52] U.S. Cl. ................... 177/1, 177/25, 177/134
[51] Int. Cl. .................... G01g 19/04, G01g 19/02
[58] Field of Search ............ 177/1, 15, 25, 134, 163

[56] References Cited
UNITED STATES PATENTS

| | | | |
|---|---|---|---|
| 2,543,794 | 3/1951 | Mayer | 177/163 UX |
| 2,746,738 | 5/1956 | Reiser | 177/134 X |
| 3,374,844 | 3/1968 | Rogers | 177/163 X |
| 3,406,771 | 10/1968 | Rogers | 177/163 X |
| 3,556,236 | 1/1971 | Cory et al. | 177/163 |

Primary Examiner—George H. Miller, Jr.
Attorney, Agent, or Firm—Fetherstonhaugh & Co.

[57] ABSTRACT

A truck weighing scale capable of measuring various axle configurations and providing individual axle weights and total truck weights. The individual axle weights are determined by successively accumulating total weights each time an axle enters on the scale and subtracting the next preceding accumulated axle weight.

4 Claims, 2 Drawing Figures

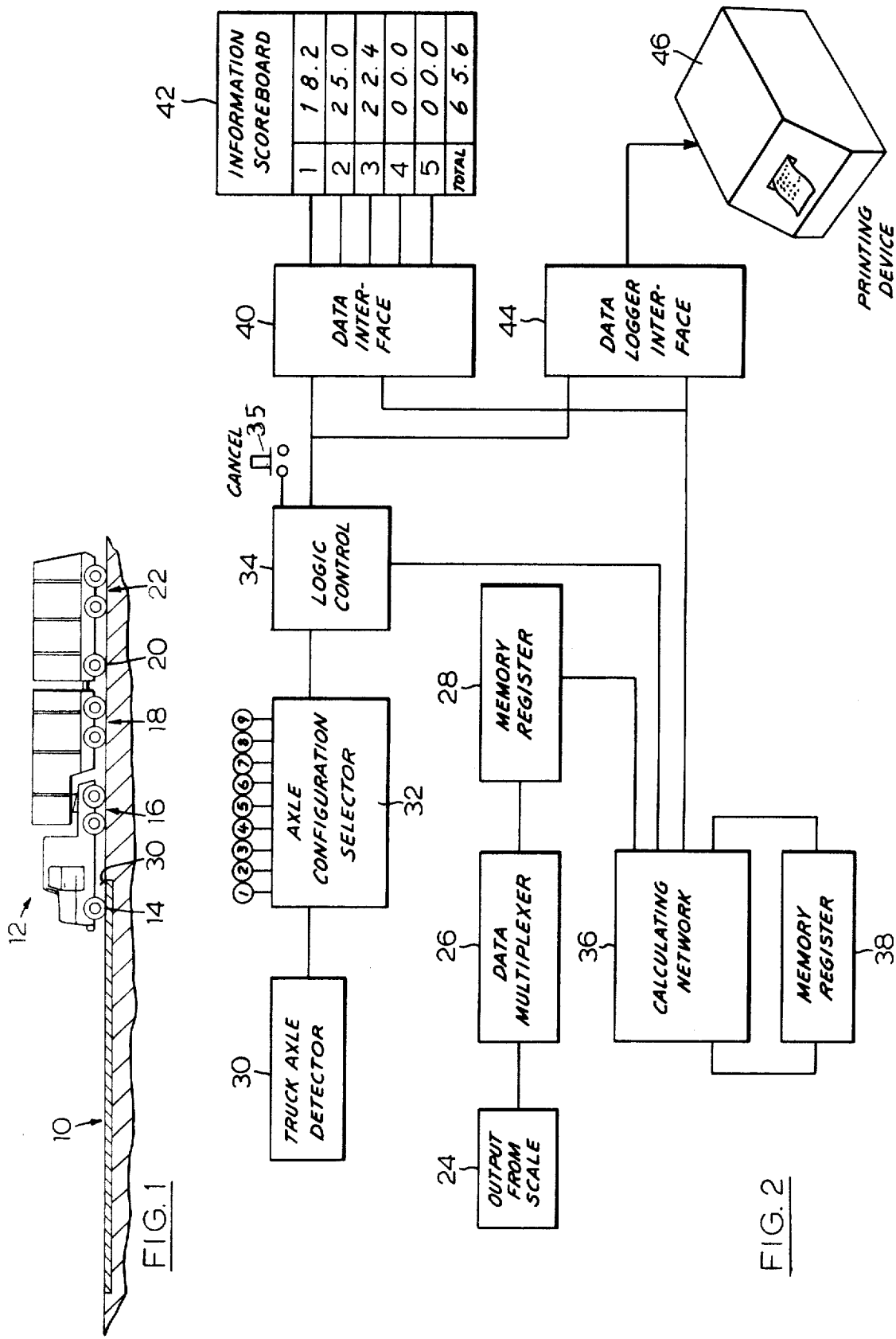

VEHICLE WEIGH SCALE

This invention relates to a weigh scale for a multiaxle highway truck.

For many years highway trucks have been a major method of transporting goods. In an effort to reduce the cost of truck transportation, there has been an ever increasing trend to produce larger trucks capable of handling larger payloads. These trucks of increased capacity have increased in length and truck units having up to nine axles are common in North America and elsewhere.

The tire size axle loading and spacing between the axles are important factors in the design of these trucks because, in order to protect the highways from undue damage, the loading per axle must be kept within reasonable limits. Most highway authorities are presently engaged in programs to reduce the allowable axle loading on truck axles in order to maintain their highway repair costs within reasonable limits and most of them have manuals of existing truck axle combinations and allowable loadings therefor, as well as allowable truck gross loads for various axle spacings.

It is common highway practice to require trucks passing predetermined weigh scales at the side of a highway to pass over the weigh scales for the purpose of checking.

The efficient weight checking of trucks has given rise to difficulty, much of which has not yet been satisfactorily overcome. In a jurisdiction where there are laws limiting loadings on axle configurations as well as gross loadings, there has been difficulty in obtaining reliable readings on the axle configurations and gross loads because of the weighing methods and equipment employed. It has been a common practice to position each axle configuration on a short scale platform and take a weight reading. The sum total of all axle configurations is added on an adding machine and compared with the gross allowable load shown on the side of the truck. A summons is issued if the truck is over its legal gross load and/or over the allowable axle load for any axle configuration.

The system is obviously time consuming and, because of this, only permits a check on a small portion of trucks using a busy highway. Moreover it is difficult to obtain a reliable gross weight due to inherent error in the weighing method arising out of the starting and stopping with resulting shifting in load, variations in approach and retreat levels and axle suspension variations. The reliability of the method is such that in the case of many infractions, it is difficult for the authorities to obtain a conviction in the case of many violations.

The system also requires considerable measurement and calculation in respect of axle centres to determine appropriate axle configurations and spacings. Inclement weather conditions increase the normal problems.

Efforts to overcome the problems with the single axle configuration weigh scale have been made and include the provision of a series of individual weigh platforms arranged close enough together to receive the various axle configurations of a highway truck. The system is quite complex, not as flexible as it might be in that it is possible for a truck to have axle configurations that would not fit the series of weigh platforms. There is not one platform per configuration and it is a costly way to get less than complete information.

This invention overcomes the difficulties of the prior art and provides a simple truck weigh scale for trucks of any axle configuration capable of giving a read-out of weight on each axle configuration in a minimum amount of time.

A weigh scale according to this invention can also be made to give total weight.

A truck weigh scale comprising a weigh platform for a truck having a length to receive a series of truck axle configurations, a weigh scale for said weigh platform with an output, a first register means connected to said output of said weigh scale, a second register means connected to the output of said weigh scale with a memory, a logic control operable upon the entry of each successive axle configuration to said weigh platform, a calculating network, a data interface, said calculating network being responsive to operation of said logic control to register the total weight on said weigh platform on said first register means at the time of operation of said logic control, calculate the difference between the total weight on said weigh platform at the next preceding time of operation of said logic control and the time of operation of said logic control, communicate the said difference to a data interface for use and transfer the total weight at the time of operation of said logic control to said second register means.

The invention will be clearly understood after reference to the following detailed specification read in conjunction with the drawings.

In the drawings:

FIG. 1 is an illustration of a truck entering the weigh platform of a scale according to this invention; and FIG. 2 is a schematic illustration of the weigh circuit of the weigh scale of this invention.

Referring to the drawings and the embodiment of the invention illustrated therein, the numeral 10 refers to the weigh platform for a truck 12. Truck 12 has a series 14, 16, 18, 20 and 22 of axle configuration. The permissible highway loadings on these configurations will depend upon the tire size, number of wheels in the configuration, type of suspension, wheel spacing within the configuration and spacing between the configurations and other factors, but the configurations and their arrangement in trucks are classified by highway authorities and there is a legal permissible load for each configuration in a particular truck arrangement. Additionally, there is a legal gross load for a given truck and axle configuration arrangement. Thus, the problem is to achieve a quick measurement of the weight on each axle configuration be it a single axle, a tandem configuration or otherwise, and a quick reading of the total weight.

It is desirable that total weight be measured with all axles on the weigh platform because, as indicated above, the weighing of separate axle configurations and totalling the weights on the separate axle configurations can give rise to error because of load shifting. Therefore, the weigh platform 10 is preferably of a length to accept the longest truck that will be admitted to it. If, however, it is only desired to check individual axle weights and one is not concerned with an accurate reading of gross weight, the scale of this invention is capable of measuring the individual axle weights accurately and efficiently with a length sufficient only to accept the individual axle configurations.

The design of the weighing mechanism of the scale 10 is not critical, but an electronic scale is preferred because of its quality of minimum oscillation. This specification will not include detail of the scale because such is not important to an understanding of the invention and the selection of an appropriate scale for the practice of the invention is within the skill of a person skilled in the art.

The scale 10, then, does have an electronic signal output that is proportional to the weight on the weigh platform 10.

Reference will now be made to FIG. 2 of the drawings which shows the output 24 from the scale fed to a data multiplexer 26 and then to a memory register 28. The memory register 28 is designed to accept the information output of the data multiplexer once every second. The scale system is designed for a truck cross-over in 30 seconds so that the time interval between the closest axle configuration is over two seconds. The time interval is related to the time of entry of the axle groups of the truck 12 to the platform 10 and is selected to give the system an opportunity to read weight for each axle configuration before the weight of the next following axle configuration is presented for read out.

The scale used is a standard electronic scale that stabilizes in about one second. The scale transmits its output information to the memory register 28 every second. The memory register 28 accepts the latest scale output information, unless it is in the process of transferring the information that it has received and stored to the calculating network for read out, in which case it rejects further information until the read out is completed. It normally takes the calculating network about one second to record a reading. It is coincidental in the case of the equipment described that the reading time of the calculating network and the updating time of the scale described are each about a second.

As will be described later, a logic control 34 is operable to trigger the taking of information from the memory register 28 and making calculations to give the data read out. When triggered, the memory register accepts the next following updating of information from the scale and then ceases to accept further information until the calculation has been made in respect of the information so stored in the memory register as above noted.

There is a detector 30 for truck axles. It can be a treadle switch operated by a tire, a photocell responsive to a tire or any other device capable of detecting the presence of the wheel or axle. A treadle switch works well, but there are many alternative devices known to those skilled in the art that could be substituted. It is preferably located adjacent the approach edge of the platform 10 and is actuated by the entry of each individual truck axle to the platform. The detector could also be made responsive to sensing by the scale of the axle weight as it comes on the platform. This or an alternative detector that does not involve a physical actuator on the platform has advantage in climates where snow and ice are common.

It will be recalled that the object of the invention is to weigh groupings or configurations of axles. In applying the highway regulations it is not so important that one know the weight on an individual axle. Rather, it is important to know the weight on axle groupings or configurations. This invention provides an axle configuration selector means 32 which can be programmed to arrange the individual axles of a truck into a series of predetermined axle configurations as the truck enters the platform 10 and its axles are detected by the axle detector means 30.

Thus, in the case of the truck illustrated in the FIG. 1, the axle detector means detects the entry of each of the eight individual axles and the axle configuration selector means 30 arranges these axles into a series of predetermined axle configurations 14, 16, 18, 20 and 22.

The programming of the axle configuration selector can be done by manual switches or a programming card for the truck being weighed. For example, the axle configuration selector might consist of a manual switch operable to program the axle configuration selector in the case of the truck indicated to actuate the logic control 34 upon the sensing of axle 14, to operate it again upon the sensing of the tandem pair of axles 16, to operate it again upon the sensing of the tandem pair of axles 18, to operate it again upon the sensing of the single axle 20 and to operate it still again upon the sensing of the tandem axle 22. Alternatively, a program card could be provided for each truck with the appropriate program for the axle configuration selector to operate the selector to group the axles as aforesaid and operate the logic control upon the admittance of each axle configuration.

Upon the entry of each axle configuration, the weight on the platform 10 is registered. This is achieved by means of a logic control 34 which responds to the operation of the axle configuration selector 32 as each complete axle configuration enters the platform and passes the truck axle detector 30 to operate the calculating network 36 to accept the weight information on the memory register 28. At any given time the information on the memory register will be the total weight on the platform up to the latest updating of the memory register 28.

Numeral 35 refers to a cancel button that is operable to cancel all recorded information.

The calculating network 36 calculates the difference between the weight information it receives from the memory register 28 and the weight information that it received from memory register 28 on its last actuation and stored in memory register 38. The difference between the two is the weight of the axle configuration last admitted to the scale.

The latest gross weight transmitted from memory register 28 is stored in the memory register 38. Memory register 38 is updated after every actuation of the logic control. The weight of each axle configuration thus calculated is transmitted to a data interface 40, from which it is transferred to an information scoreboard 42. The scoreboard 42 has an appropriate place for the entry and recording of each axle configuration of a truck as it is admitted to the platform and calculated in weight by the system. The scoreboard illustrated is adapted to record the axle configuration weights of five axle configurations. Scoreboard 42 is of any appropriate design or type and is adapted to retain the information presented to it until cancelled.

If a written record of the weight is desired, it can be provided for. Numeral 46 refers to a printing device that is connected to the data logger interface 44 and gives a written read out of the information from the calculating network.

The printing device could be of many available types such as teletype (either ASC11 American Standard Code for interchange or Five Level Baudot Code), and the interface 44 is designed therefor.

The interface 40 which transfers the information to the scoreboard 42 decodes the information from BCD Serial to the method of display of the scoreboard 42 which can be one of many well known types of read out, for example, seven segment, nine segment, decimal one of ten decoder.

As indicated above, the memory register 38 registers the latest weight accepted by the calculating network 36 and when the last axle configuration has been admitted to the weighing platform, the gross weight from the memory register is transmitted to the data interface and recorded on the scoreboard and/or paper record of the data logger.

In some applications it may be desirable to measure the weight on each axle of a truck, in which case each of the axle configurations would comprise only one axle.

The memory register 28 would normally receive the next following transfer of information from the data multiplexer upon operation of the logic control to record a weight as described. However, it is conceivable that it could record the weight from the information received on the next preceding transfer of information from the data multiplexer upon operation of the logic control. In either arrangement the weight register means is responsive to the axle configuration selector means to register the weight on the weigh scale upon the operation of the logic control.

Thus, the system is capable of accurately recording the total weight of a truck and also of recording in an efficient manner the weight on each axle configuration. There is no difficulty with the design of a unit that will give all of this information as the truck passes over the weight platform of the scale.

SUPPLEMENTARY DISCLOSURE

It will be apparent that the function of the truck axle detector 30 and the axle configuration selector 32 could be performed by an operator who could manually operate the logic control as each axle configuration of the truck 12 enters the weigh platform 10. In this case, the register 28 would be updated upon each manual operation of the logic control and the calculating network would transfer to the data interface the difference between that weight and the weight at the time of entry of the next preceding axle configuration to give the weight of the axle configuration as before.

The manual operation of the apparatus is essentially the same in principle, i.e., it uses a memory register and a calculating network to measure the total weight of the platform upon the entry of each axle configuration and derives the weight of each axle configuration by subtracting therefrom the total weight on the platform at the time of entry of the next preceding axle configuration.

For example, with the truck illustrated, the operator would manually operate the logic control just after each of the axle configurations 14, 16, 18, 20 and 22 were fully on the platform.

Modifications in the apparatus indicated will also be apparent. For example, memory register 28 need not have a memory. It only need register the weight at the time of entry of the axle configuration for comparison with the weight on the memory register 38 of the weight at the time of entry of the next preceding axle configuration. It is the principle of measuring the loading of a series of axle configurations of a truck comprising the steps of moving a truck onto a weigh platform having a length to admit a series of axle configurations, recording the total weight on the platform at the time of entry thereon of each axle configuration and subtracting from the total weight as just aforesaid, the total weight on the platform at the time of entry thereon of the next preceding axle configuration that is important. The method also permits the obtaining of the total weight of the truck by a summation calculation. It will also be apparent that it could be used to measure individual axle weights in a case where only some and not all of the axles could be accommodated by the scale platform.

The embodiments of the invention in which an exclusive property or privilege is claimed are defined as follows:

1. A truck weigh scale comprising
a weigh platform for a truck;
a weigh scale for said weigh platform;
detector means for truck axles on said platform;
axle configuration selector means responsive to predetermined programming for arranging the axles of a truck in a series of predetermined axle configurations as its axles are detected by said detector means; and
weight register means responsive to said axle configuration selector means to register weight on said weigh scale,
said weight register means comprising a first memory register for weight on said weigh platform having an updating time base, a logic control, a calculating network, a data interface and an information recorder, said logic control being responsive to said axle configuration selector means to operate said calculating network to accept the weight information in said first memory register upon the operation of said logic control, said time base being less than the time between entry of succeeding axle configurations in use, a second memory register adapted to accept and record the weight information transferred to said calculating network when said calculating network is operated by said logic control for use by said calculating network at the next following time of operation of said logic control, said calculating network being adapted to calculate the difference between the weight information on said memory registers at the time of operation of said logic control and transmit it to said data interface for use by said information recorder.

2. A method of measuring the loading of a series of axle configurations of a truck comprising the steps of moving the truck onto a weigh platform having a length to admit said series of axle configurations,
recording the total weight on the platform at the time of entry thereon of each axle configuration,
and subtracting from the total weight as just aforesaid the total weight on the platform at the time of entry thereon of the next preceding axle configuration.

3. A method of measuring the loading of a series of axle configurations of a truck as claimed in claim 2 including recording in addition the total weight on the platform at the time of entry of the last axle configuration in the series.

4. A truck weigh scale comprising a weigh platform for a truck having a length to receive a series of truck axle configurations, a weigh scale for said weigh platform with an output, a first register means connected to said output of said weigh scale, a second register means connected to the output of said weigh scale with a memory, a logic control operable upon the entry of each successive axle configuration to said weigh platform, a calculating network, a data interface, said calculating network being responsive to operation of said logic control to register the total weight on said weigh platform on said first register means at the time of operation of said logic control, calculate the difference between the total weight on said weigh platform at the next preceding time of operation of said logic control and the time of operation of said logic control, communicate the said difference to a data interface for use and transfer the total weight at the time of operation of said logic control to said second register means.

* * * * *